(12) United States Patent  (10) Patent No.: US 8,271,793 B2
Swildens et al.  (45) Date of Patent: Sep. 18, 2012

(54) DYNAMIC MULTIMEDIA FINGERPRINTING SYSTEM

(75) Inventors: Eric Sven-Johan Swildens, Mountain View, CA (US); Zaide Liu, Cupertino, CA (US); Richard David Day, Upton, MA (US); Pradeep Kumar Chetal, Mountain View, CA (US)

(73) Assignee: Akami Technologies, Inc., Cambridge, MA (US)

( * ) Notice: Subject to any disclaimer, the term of this patent is extended or adjusted under 35 U.S.C. 154(b) by 582 days.

(21) Appl. No.: 12/489,375

(22) Filed: Jun. 22, 2009

(65) Prior Publication Data

US 2009/0259853 A1  Oct. 15, 2009

Related U.S. Application Data

(63) Continuation of application No. 11/101,753, filed on Apr. 8, 2005, now Pat. No. 7,552,338.

(60) Provisional application No. 60/627,798, filed on Oct. 29, 2004.

(51) Int. Cl.
*H04L 29/06* (2006.01)
*H04L 9/32* (2006.01)
(52) U.S. Cl. .................. 713/176; 713/168; 713/150
(58) Field of Classification Search .................. None
See application file for complete search history.

(56) References Cited

U.S. PATENT DOCUMENTS

| 5,892,904 A | 4/1999 | Atkinson et al. |
|---|---|---|
| 6,141,753 A | 10/2000 | Zhao et al. |
| 6,170,013 B1 | 1/2001 | Murata |
| 6,189,146 B1 | 2/2001 | Misra et al. |
| 6,393,420 B1 | 5/2002 | Peters |
| 6,484,143 B1 | 11/2002 | Swildens et al. |
| 6,983,315 B1 | 1/2006 | Crutcher |
| 6,990,526 B1 | 1/2006 | Zhu |
| 7,003,555 B1 | 2/2006 | Jungck |
| 7,114,177 B2 | 9/2006 | Rosenberg et al. |
| 7,188,240 B1 | 3/2007 | Berstis et al. |
| 7,203,838 B1 | 4/2007 | Glazer et al. |
| 7,315,942 B1 | 1/2008 | Linden et al. |
| 7,536,725 B2 | 5/2009 | Raciborski |

(Continued)

FOREIGN PATENT DOCUMENTS

WO  WO0059177  3/2000

(Continued)

OTHER PUBLICATIONS

Wikipedia, "Theraography", retrieved from internet: http://en.wikipedia.org/wiki/Theraography, printed 2008, 3 pages.

(Continued)

*Primary Examiner* — David Y Jung
(74) *Attorney, Agent, or Firm* — Joshua T. Matt

(57) ABSTRACT

A dynamic multimedia fingerprinting system is provided. A user requests multimedia content from a Web cache server that verifies that the user is authorized to download the content. A custom fingerprint specific to the user is generated and dynamically inserted into the content as the content is delivered to the user. The custom fingerprint can be generated on the Web cache server or at the content provider's server. The system allows a content provider to specify where the custom fingerprint is inserted into the content or where the fingerprint is to replace a placeholder within the content.

22 Claims, 5 Drawing Sheets

U.S. PATENT DOCUMENTS

| | | |
|---|---|---|
| 7,552,338 B1 | 6/2009 | Swildens et al. |
| 8,010,705 B1* | 8/2011 | Sebastian et al. ............. 709/247 |
| 8,145,908 B1 | 3/2012 | Liu et al. |
| 2002/0023221 A1 | 2/2002 | Miyazaki et al. |
| 2002/0092026 A1 | 7/2002 | Janniello et al. |
| 2002/0124170 A1 | 9/2002 | Johnson, Jr. |
| 2002/0138511 A1 | 9/2002 | Psounis et al. |
| 2002/0166053 A1 | 11/2002 | Wilson |
| 2002/0184333 A1 | 12/2002 | Appelman |
| 2003/0028777 A1 | 2/2003 | Hennessey et al. |
| 2003/0074378 A1 | 4/2003 | Midgley et al. |
| 2003/0084294 A1 | 5/2003 | Aoshima et al. |
| 2004/0003248 A1 | 1/2004 | Arkhipov |
| 2004/0010543 A1 | 1/2004 | Grobman |
| 2004/0068579 A1 | 4/2004 | Marmigere et al. |
| 2004/0236824 A1 | 11/2004 | Millington et al. |
| 2005/0004943 A1 | 1/2005 | Chang |
| 2005/0038890 A1 | 2/2005 | Masuda et al. |
| 2005/0182939 A1 | 8/2005 | Yoshiura et al. |
| 2006/0041754 A1 | 2/2006 | Hind et al. |
| 2006/0080525 A1* | 4/2006 | Ritter et al. .................... 713/155 |
| 2006/0095388 A1 | 5/2006 | Brown et al. |
| 2006/0098645 A1 | 5/2006 | Walkin |
| 2007/0005779 A1 | 1/2007 | Yao et al. |
| 2007/0028111 A1 | 2/2007 | Covely |
| 2008/0288515 A1 | 11/2008 | Kim et al. |
| 2010/0235542 A1 | 9/2010 | Visharam et al. |
| 2010/0235569 A1 | 9/2010 | Nishimoto et al. |
| 2010/0332834 A1 | 12/2010 | Fu et al. |
| 2011/0035595 A1* | 2/2011 | Bartram et al. ................ 713/175 |
| 2011/0078327 A1 | 3/2011 | Li et al. |
| 2011/0125820 A1 | 5/2011 | Lin |
| 2011/0131298 A1 | 6/2011 | Courtemanche et al. |
| 2011/0219229 A1* | 9/2011 | Cholas et al. .................. 713/168 |
| 2011/0225417 A1* | 9/2011 | Maharajh et al. .............. 713/150 |
| 2011/0271007 A1* | 11/2011 | Wang et al. .................... 713/160 |

FOREIGN PATENT DOCUMENTS

| | | |
|---|---|---|
| WO | WO03103214 | 12/2003 |

OTHER PUBLICATIONS

Kant, et al., "Architectural Impact of Secure Socket Layer on Internet Servers", Proceedings of the International Conference on Computer Design, Sep. 2000, pp. 7-14.

Ciminiera, et al., "Authentication Mechanisms in Microprocessor-Based Local Area Networks", IEEE Transactions on Software Engineering, vol. 15, Issue 5, May 1989, pp. 654-0658.

Blundo, et al., "A Lightweight Approach to Authenticated Web Caching", The 2005 Symposium on Applications and the Internet, Jan.-Feb. 2005, pp. 157-163.

Zhao, Jian; Applying Digital Watermarking Techniques to Online Multimedia Commerce; Proc. of the Int'l Conference on Imaging Sciences, Systems, and Applications, Las Vegas, Jun. 30-Jul. 3, 1997. 7 pages.

\* cited by examiner

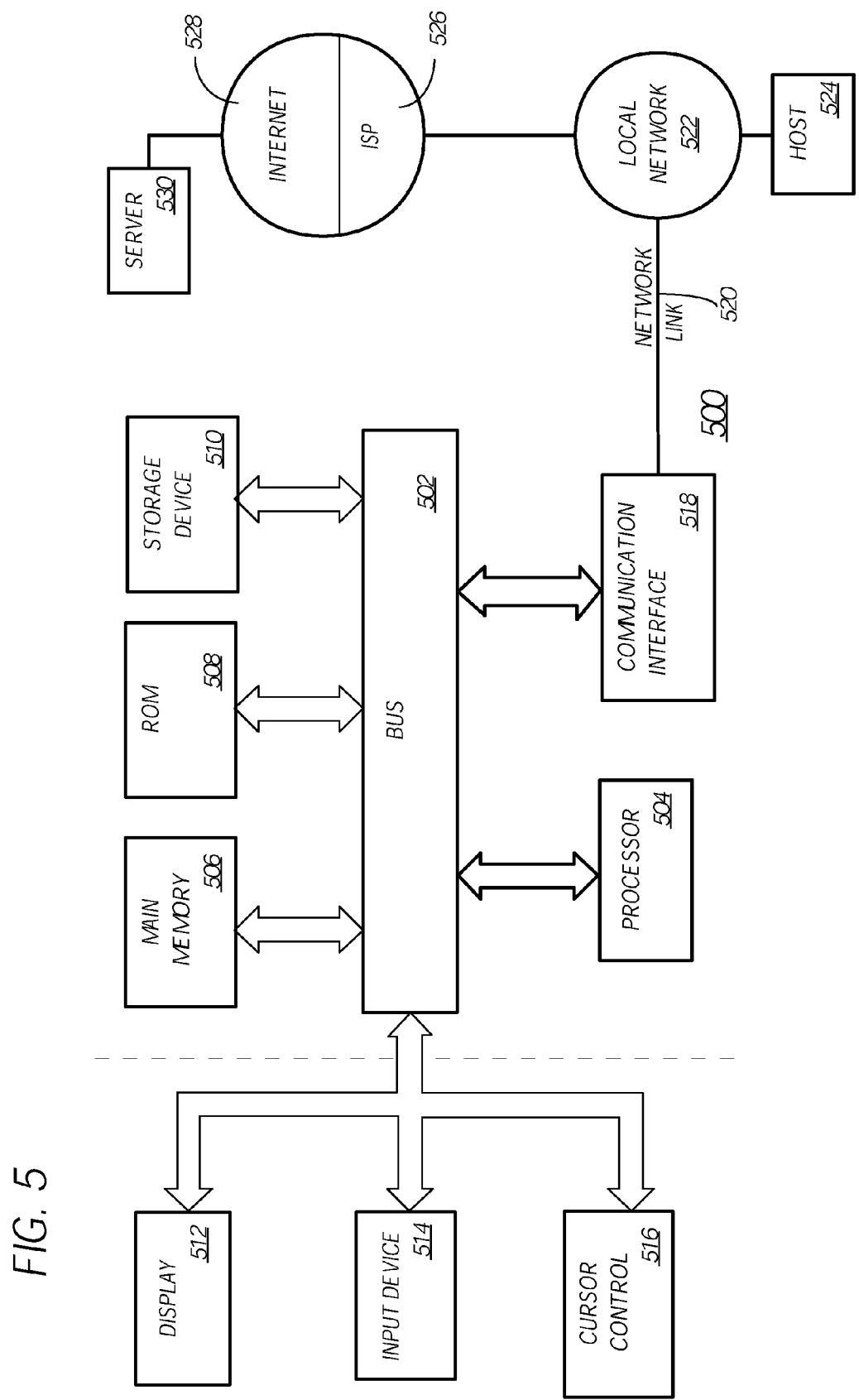

DYNAMIC MULTIMEDIA FINGERPRINTING SYSTEM

RELATED APPLICATION DATA

This application is a continuation of U.S. patent application Ser. No. 11/101,753, filed Apr. 8, 2005, which claims priority to Provisional U.S. Patent Application No. 60/627,798, filed on Oct. 29, 2004, the entire disclosures of which are hereby incorporated by reference as if fully set forth herein.

The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to dynamically inserting fingerprints into multimedia files while delivering the files across a network.

BACKGROUND

The Internet in its present-day form allows users to perform a multitude of tasks that encompass the fields of information dissemination and management, entertainment, merchandising, shopping, auctions, communications, etc. The increasing popularity of the Internet has created a massive explosion of the number of multimedia documents stored at servers distributed across the Internet. Users download millions of documents per hour via the Internet. A large number of those documents are illegally distributed between users and their peers or via bootleg Web sites.

Because of the pace of the mass distribution of multimedia material, many issues have arisen regarding the ownership, or copyrights, of the authors and providers of such material. Some solutions have been used to try to preserve the copyrights of authors and providers. Digital solutions such as signatures, watermarks, and hidden tags within the material have been used to mark the material. The marked material is then distributed to end users. Unfortunately, these approaches are static solutions that are added during the creation of such material and can only indicate the author's or provider's identity.

Static approaches do not track the original purchaser of a particular content. For example, a video file may be legally obtained by one user through a purchase from a content owner. The video file is then illegally distributed across the Internet by that user. When the illegal copies are discovered by the content owner, the content owner has no idea who the original purchaser of the video file was.

Organizations such as the Motion Pictures Association of America (MPAA) have begun nationwide searches for illegal distribution of their content. The MPAA, for example, has sued many individuals for the illegal distribution of the MPAA's members' content. If a content owner could stem the illegal distribution of their content by tracking down the original content purchaser and stopping the initial distribution from ground zero, then there would be less proliferation of illegal copies of the content.

It would be advantageous to provide a dynamic multimedia fingerprinting system that allows content owners to be able to examine content and easily discover the identity of the original purchaser. The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments of the present invention are illustrated by way of example, and not by way of limitation, in the figures of the accompanying drawings and in which like reference numerals refer to similar elements and in which:

FIG. 5 is a block diagram that illustrates a computer system upon which an embodiment of the invention may be implemented.

DETAILED DESCRIPTION

Figure 1:
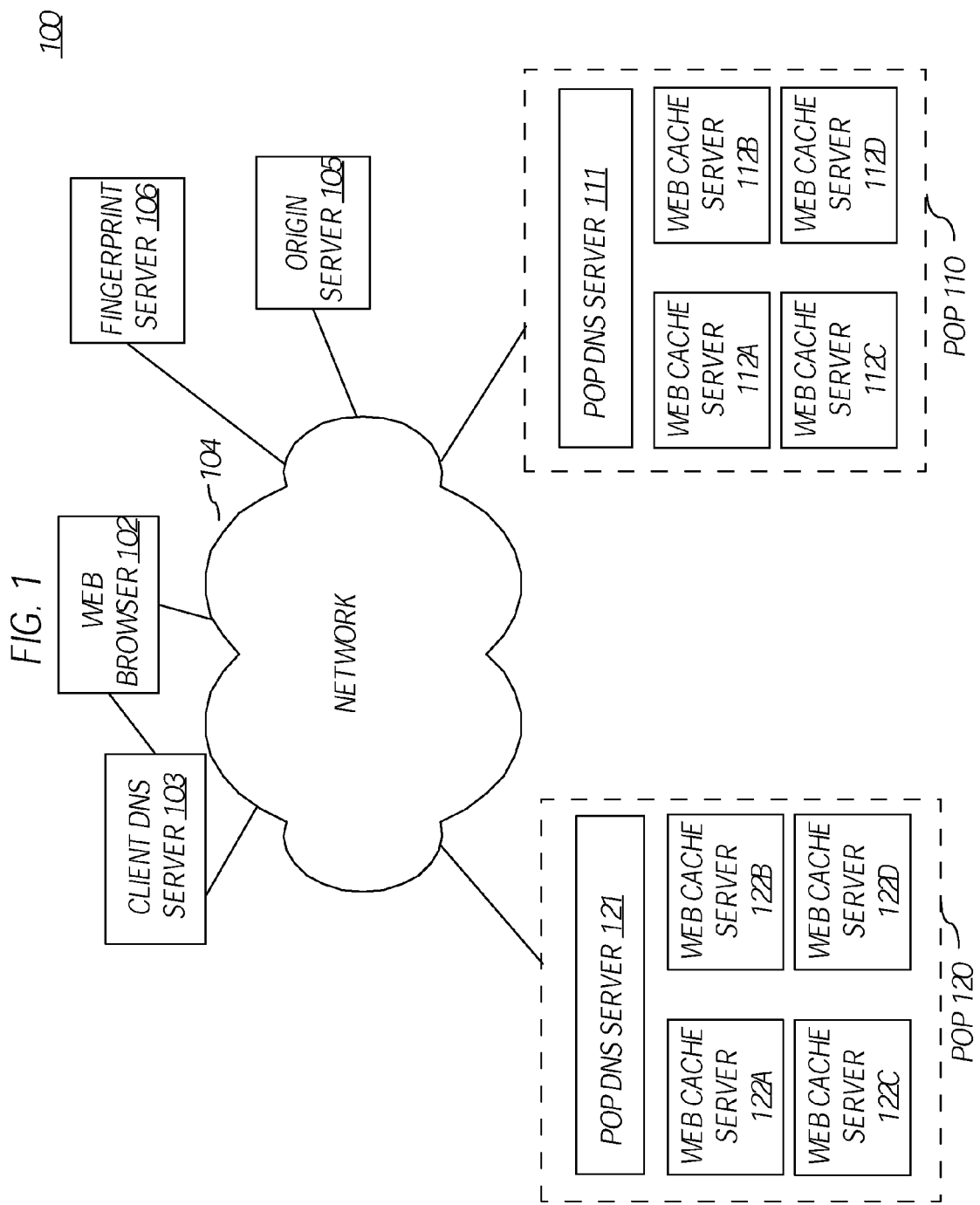
FIG. 1 is a block diagram illustrating a Content Delivery Network implementing an embodiment of the invention according to an embodiment of the invention.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form in order to avoid unnecessarily obscuring the embodiments of the present invention described herein.

Functional Overview

An approach for a dynamic multimedia fingerprinting system is presented. Embodiments of the invention perform dynamic fingerprinting of content. Specifically, embodiments of the invention advantageously allow caching servers to dynamically insert fingerprints into original documents and on-demand or live streaming media.

A cache server receives a client's request for multimedia content (documents, streaming media, files, pictures, etc.). The cache server verifies that the client is authorized to receive the requested content. There are two types of authentications: external authentication and local authentication. External authentication is performed via the content provider's server which queries the client for the user's information via the cache server. Local authentication is performed on the cache server which queries the client directly for client information. The method that is used by the cache server is configured by the customer or administrator and may be configured differently for each type of content.

If the user is authorized to receive the requested content, the cache server retrieves a custom fingerprint for the content. The cache server can retrieve the fingerprint from the content provider's server or generate the fingerprint locally. The cache server is configured by the customer or an administrator to retrieve the fingerprint locally or externally and may be configured differently for each type of content.

The cache server is configured by the customer or administrator to insert the fingerprint at a specific location in the content or to replace a placeholder in the content at a specified location while the content is being delivered to the client.

The cache server provider can charge a fee to the content provider for the volume of traffic that the content provider uses for dynamic fingerprinting in the cache server.

Architecture Overview

An embodiment of the invention dynamically inserts digital fingerprints into content that is distributed to end user clients. The system enables a content provider to provide a single copy of a particular content to a distribution server. The distribution server distributes copies of the content containing custom fingerprints to end users. The system eliminates the need for multiple copies of a particular content to be resident on a server. Other approaches require that multiple copies of content be present, each having a different watermark or digital signature.

The system also allows the content provider to control the content of the fingerprint because distribution servers do not have to know the format or content of the fingerprint. The distribution servers simply insert the fingerprint where they are told. A custom fingerprint is issued by a content provider and sent to a distribution server at the time that an end user requests the content. The custom fingerprint contains information pertaining to the requesting end user and simplifies the tracking of distributed content.

A fingerprint can be added to any content that can be distributed such as: a regular HTML document, streaming media, or any file to be downloaded via the Internet to end user clients.

The fingerprint is typically inserted on the fly at the time the content is delivered or streamed to the end user client. The system inserts or replaces a specific length of special code at the beginning, end, or a specified position within the document while it is being delivered. The special code can be in alphanumeric string format or any binary representation. Alternatively, fingerprinting the content results in decoding the original document or stream and applying a new encoding to the original document or stream. The new encoding may be dynamically defined for format conversion or resolution reduction purposes.

FIG. 1 is a block diagram illustrating a system 100 that incorporates a Content Delivery Network (CDN). An embodiment of the invention can be implemented in a CDN system as described in U.S. Pat. Nos. 6,405,252, 6,754,706, 6,484,143, 6,754,699, and 6,694,358, all owned by the Applicant and incorporated herein by reference. A plurality of Point of Presence sites (POPs) are distributed across the network 104. Here two POPs 110 and 120 are shown. The network 104 is typically the Internet, but can be any other large scale network such as an enterprise intranet.

Each POP 110, 120 contains a plurality of Web cache servers 112A-112D, 122A-122D. Operationally, a Web cache server caches cacheable CDN customer (also referred to as content provider) content such as images, video, documents, and static Web page content obtained from the customer's origin server 105 and serves the cached content to client systems 102. The origin server 105 serves dynamic content to the client system 105. The Web cache server can also operate as a mirror server, serving all of the content of an origin server 105.

When a client makes a request for Web content through its Web browser 102, the request is sent to the client's local DNS server 103 for resolution of the host name. For example, Web browser 102 may transmit a request to resolve the host name of "www.customer.com" to client DNS server 103. The client DNS server 103 sends a domain name resolution request to a customer DNS server. Since the customer DNS server is configured to delegate its domain to a POP DNS as the authoritative DNS, it tells the client DNS server 103 to contact the authoritative POP DNS IP address for resolution of the request. The client DNS server 103 then sends the request to the authoritative POP DNS server 111.

The authoritative POP DNS server 111 finds an appropriate Web cache server within the Web cache servers 112A-112D in the POP to serve the content to the client based on factors such as traffic load, latency, whether the server is more likely to have the content cached, etc. The authoritative POP DNS server 111 returns the IP address of the Web cache server (e.g., 112A) to the client DNS server 103. The client DNS server 103 sends the address to the client Web browser 102.

Once the client Web browser 102 receives the IP address of the Web cache server 112A, it sends a request for Web content to the Web cache server 112A. The Web cache server 112A receives the request and searches its cache for the requested content. If the requested content is found in the Web cache server's cache, the Web cache server 112A checks if the requested content requires user authentication and, if so, performs an authentication process with the requesting user to ensure the user is authorized to receive the requested content (described in detail below), and, if it is successful, obtains a signature from the customer's server that serves fingerprints 106. The Web cache server 112A inserts the fingerprint into the content. The fingerprint is placed within the content in the position specified by the customer. The customer can specify whether the fingerprint is to be inserted in the beginning, end, or a specific position in the content. The content may also contain a placeholder in a specific position within the content which is replaced by the Web cache server 112A with the fingerprint. The content is then sent to the client Web browser 102.

If the content is not found in the Web cache server's cache, then the Web cache server 112A can request the content from the origin server 105. Once the Web cache server 112A receives the content from the origin server 105, it checks if the requested content requires user authentication and, if so, performs an authentication process with the requesting user (described in detail below), and, if it is successful, obtains a signature from the customer's server that serves fingerprints 106. The Web cache server 112A inserts the fingerprint into the content. The fingerprint is placed within the content in the position specified by the customer. The customer can specify whether the fingerprint is to be inserted in the beginning, end, or a specific position in the content. The content may also contain a placeholder in a specific position within the content which is replaced by the Web cache server 112A with the fingerprint. The content is then sent to the client Web browser 102.

Although a fingerprint server 106 is described above, any of the CDN servers (Web cache, DNS, etc.) or the customer servers (origin, fingerprint) from the content provider can generate the fingerprint information.

The fingerprint described throughout this document can be expanded to include many different applications, for example:

Distribution tracking—tracking who downloaded the content, the time, and from which Web server.
Secret key delivery—embedding a secret key in the content on the fly during delivery.
Dynamic tagging—dynamically changing the URL tags or other specific data in the file during delivery.

Dynamic digital rights—dynamically inserting digital rights information into streaming media during delivery.

Unique identification—dynamically tagging the content/stream with unique identification information.

Customer support—support personnel can ask the client to submit questions with the problematic fingerprinted document so that they can easily match and track problems.

Figure 2:
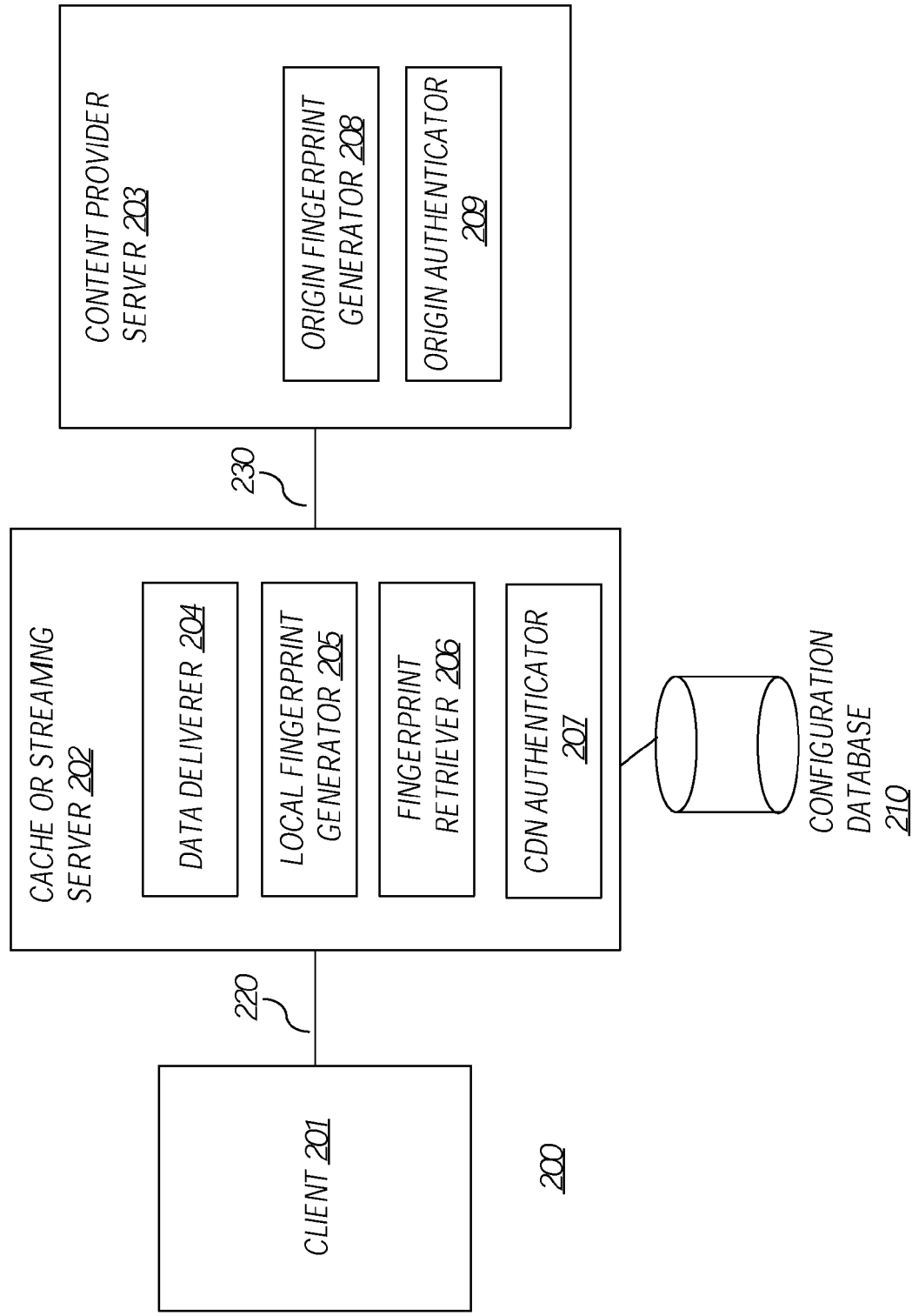
FIG. 2 is a block diagram illustrating corresponding dynamic fingerprint modules in a Web cache server and a content provider server according to an embodiment of the present invention.

FIG. 2 is a block diagram illustrating a system 200 that implements an embodiment of the invention in a networked environment. For ease of explanation, a single cache or streaming server 202 is shown as well as a single content provider server 203 are shown, however, the embodiment of the invention can apply to a plurality of cache and/or streaming servers and a plurality of content provider servers. The cache or streaming server 202 is a server that provides HTTP delivery mechanisms, downloading mechanisms, and/or streaming mechanisms. Fingerprint modules can be installed on any number of these servers in a multiple server application.

The client 201 makes a request for content (documents, streaming media, files, pictures, etc.) from the cache server 202. The cache server 202 verifies that the client 201 is authorized to receive the requested content. The cache server 202 has a CDN authenticator module 207 that performs the authentication tasks for the cache server 202.

There are two types of authentications: external authentication and local authentication. External authentication is performed via either the HTTP redirect method or via the proxy method querying the origin authenticator module 209 on the content provider server 203. Local authentication is performed on the cache server 202 with the CDN authenticator module 207 querying the client directly for client information. The authenticator typically asks the client for a username and password. The CDN authenticator module 207 can return the success or failure of the authentication to an invoking process. The method that is used by the cache server 202 is configured by the customer or administrator and may be configured differently for each type of content. Details of the authenticator module are discussed below in more detail.

Once the CDN authenticator module 207 finds that the client 201 is authorized to receive the requested content, the fingerprint retriever module 206 retrieves a custom fingerprint for the content. The fingerprint retriever module 206 can retrieve the fingerprint from an external origin fingerprint generator 208 or a local fingerprint generator 205 that may be co-located on the cache server 202 with the fingerprint retriever module 206 or on another CDN server. The external origin fingerprint generator 208 is typically located on a remote server at the content provider's site, such as dedicated fingerprint server or a content provider server 203, as illustrated in FIG. 2. The cache server 202 is configured by the customer or an administrator to retrieve the fingerprint locally or externally and may be configured differently for each type of content. The fingerprint from the remote site does not need be understood or interpreted by the cache server 202.

The fingerprint is handed to the data deliverer 204 by the fingerprint retriever 206. The data deliverer module 204 is for delivering the content to the client. This can be a generic cache server software module that is fingerprint aware and has the intelligence for inserting the fingerprint into the content data stream during the delivery stage. The data deliverer module 204 is configured by the customer or administrator to insert the fingerprint at a specific location in the content or to replace a placeholder in the content at a specified location.

A configuration database 210 is used for storing the fingerprint configuration as well as for recording content distribution statistics. The database is used by modules in the cache server 202 to retrieve their configuration information as well as storing information for retrieved content. The content distribution statistics can be used, for example, to inform the customer of the frequency and popularity of its content as well as the identity of the users that performed successful downloads. The CDN provider can use the content distribution statistics to charge a fee for the volume of traffic that the customer uses for dynamic fingerprinting in the CDN.

Fingerprint Configuration and Information

An embodiment of the invention gives the CDN customer total control over the content of the fingerprint when the customer server creates and serves the fingerprint to the Web cache servers. The Web cache server does not need to know the content of the fingerprint because it inserts the fingerprint into the content at the point where the customer has configured it to do so. Another embodiment allows the Web cache server to generate the fingerprint. The fingerprint may consist of any, or a combination, of the following information:

Digital rights.
Authentication tokens.
Tracking number of the distribution.
A unique download sequence number.
Download date and time.
A message digestion, such as MD5.
License key to the end user.

The fingerprint can be either fixed or variable in size. It can be inserted into the content or stream at the beginning, end, or anywhere within the content. The fingerprint can replace a marked placeholder in the original content or media.

A user interface from the CDN provider allows customers or administrators to configure the settings for the dynamic fingerprint system. The customer or administrator can configure the system to provide user authentication, manage content within the CDN Web cache servers, setting Web cache server behavior, etc. The configuration parameters include:

Login and user authentication.
Uploading content into the CDN to be fingerprinted (e.g., the content is preloaded into Web cache servers allocated to the customer).
Tagging URLs that to be fingerprinted (e.g., the document is not preloaded, and but will be cached in the CDN on demand).
Setting fingerprint properties of content.
Adding, deleting, and editing the content as well as their properties.

More specifically, the user interface allows the customer or administrator to configure specific operations on the Web cache servers such as:

Tagging—Specifying the file or URL of the content or media to be fingerprinted.

Figure 3:
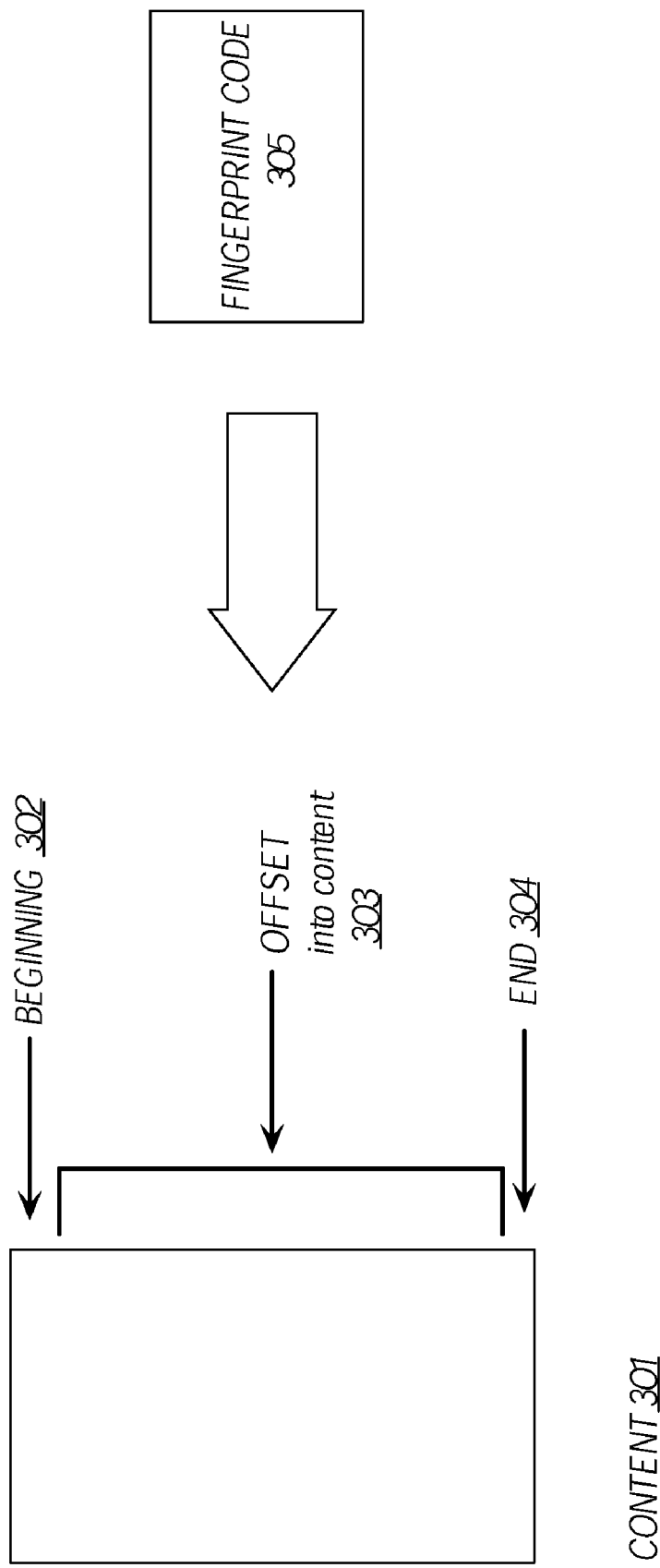
FIG. 3 is a block diagram illustrating the insertion of a fingerprint in a configurable location in a requested content according to an embodiment of the present invention.

Offset—Configuring the location offset in the content or media for insertion or replacement of fingerprint code. For example, FIG. 3 illustrates the positions within the content 301 that the fingerprint 305 may be specified to be placed. The customer or administrator can enter an offset value or beginning or end indicator in a pull-down menu user interface, for example. The Web cache server receives values from the user interface such as:

a. Offset 0 to specify the beginning of the document 302.
 b. Offset −1 to specify the end of the document 304.
 c. Offset (m) to specify starting at m bytes 303 in the content 301.

Length—Specifying the length of the fingerprint 305. For example, to specify variable length, the customer or administrator specifies variable length in a menu in the user interface and the value received by the Web cache server is −1. Otherwise, specifying a fixed length results in a positive value sent to the Web cache server.

Mode—Setting the insertion or replacement mode for the fingerprint, i.e., whether the Web cache server is to insert the fingerprint at the specified location or whether it is to replace a code already inserted in the content.

Method—Configuring the fingerprint generation method used by the Web cache server. There are two basic methods:

a. External fingerprint generation from the origin site. The fingerprint retriever module retrieves the fingerprint from a corresponding fingerprint server 203. To retrieve a fingerprint, a fingerprint retriever module 206 on the Web cache server 202 sends a retrieving URL with authentication information as a URL parameter to the remote site specified by the customer or administrator, such as content provider server 203. The URL format may appear as follows:
   www.customer.com/
       fingerprint?file=xyz.mwa&userz=adamsmith
   The remote site www customer.com 203 has an origin fingerprint generator module 208 that, after the user is authenticated by the origin authenticator module 209, generates a fingerprint based on the user information for the specified file and responds to the URL request with the generated fingerprint code.
   The example URL above passes the document file name and user identity to the remote site for generating a fingerprint. However, it is possible for the CDN provider to pass any combination of the following information to the remote site:
   URL.
   Document name.
   User identity.
   Cookies.
   HTTP header.
   The client's IP address.
   Posted variables and values from the client.

b. Local fingerprint generation by the CDN provider. The CDN provider can provide several common fingerprint mechanisms that can be performed locally on the Web cache server or a local CDN server that gives the customer the flexibility of selecting any that match its business needs. The fingerprint is generated transparently on the fly by the Web cache server 202 or local CDN server during the download or streaming stage.

Authentication—Configuring the authentication method for the access of the content or the media. There can be three values for the authentication methods:

a. No authentication.
   b. External authentication. The authentication is performed by the customer at its site.
   c. Local authentication. The authentication is performed locally by the CDN itself. This means the CDN has a user authentication database accessible by the Web cache server or CDN server that performs the authentication.

Authentication Configuration

An embodiment of the invention provides a unified authentication mechanism for the CDN. An authenticator module is provided that works for both local and remote authentication. The authentication module is configurable by the customer or administrator to perform user authentication locally or remotely. The authentication module may be selectively activated for a particular type of content.

A user interface is provided by the CDN to give the customer and/or administrator access to a configuration interface for the CDN dynamic fingerprinting functionality. The customer and/or administrator may set an authentication property through the user interface for any URL, domain, or a regular expression of URL. The customer and/or administrator can enter any number of specific entries and the treatment required for each entry. The authenticator module on the Web cache server or streaming server will treat the requested content as specified by the customer and/or administrator. For example:

www.customer.com/partner/: www.customer.com/auth
   This entry specifies that any access to URLs underneath "partner" must be authenticated through the external URL www.customer.com/auth.
   sales.customer.com: www.customer.coin/auth
   This entry specifies that any access to URLs in the sales domains must be authenticated through the external URL www.customer.com/auth.
   www.customer.com/*.mwa: local-auth
   This entry specifies that the CDN provider itself will perform authentication for any access to Microsoft audio files. This may mean that the authenticator module on the Web cache server or streaming server performs the authentication or another CDN server performs the authentication for the Web cache server or streaming server.
   marketing.customer.com: no-auth
   This entry specifies that there is no need for authentication for the marketing URLs. The fingerprint may be dynamically generated simply based on the client HTTP request header information (e.g., browser language and time zone) and/or client source IP address.

Authenticating a User

The authenticator module can be a CGI or integrated module in the cache server and/or streaming server software. Whenever a user clicks on a URL that has the authentication property active, the authenticator module is invoked. The authenticator module first checks if the property is set to perform local authentication or remote authentication by the content provider.

For local authentication, the authenticator module sends a form asking the client to fill in the username and password. The authenticator module checks against the authentication database in the configuration database to see if the user has the permission for the URL access. If so, it passes the user identity back to the invoking process with a success code and exits (the authenticator module can also be the main invoking process, can invoke another process and pass the process the information, etc.). The fingerprint retriever then continues with the process.

Figure 4:
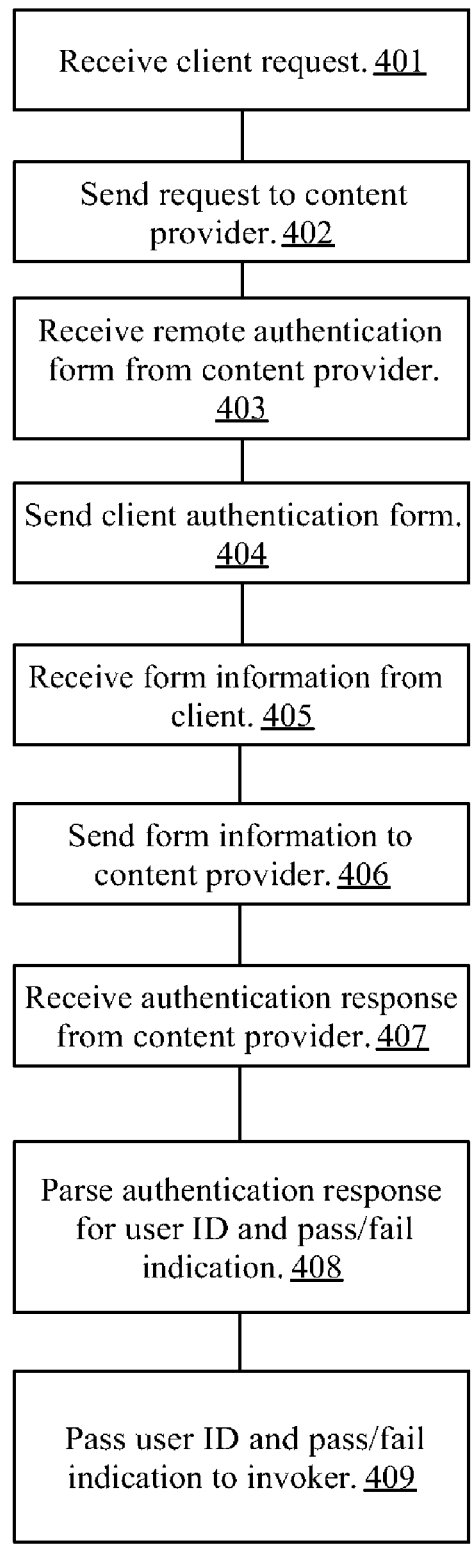
FIG. 4 is a flow chart of an authorization process according to embodiments of the present invention.

For remote authentication, the authenticator module acts a proxy. FIG. 4 illustrates a flowchart of the remote authentication process. The authenticator module receives the client's request 401 and sends an HTTP request with the URL specified by the client to the content provider site on the client's behalf 402. The authenticator module in the remote server retrieves an authentication form (e.g., a logon form or other user authentication form that the user enters account information or other pre-arranged information that the content provider and user have agreed upon) and returns the form to the authenticator module 403. The authenticator module passes the form to the client 404.

The user fills in the form at the client and the client sends the user's form information to the authenticator module 405. The authenticator module sends the form information to the remote authentication module 406. The remote authenticator module receives the form information and checks its database to see if the user is authorized to receive the requested content (e.g., the user has purchased a license for the content). The remote authenticator sends the success or failure result and the user's identity to the authenticator module 407.

The authenticator module parses the response to retrieve the success or failure indication and the user identity 408. To simplify the parsing, the CDN provider and all of the customers can agree on a common format for submitting the response. All the authenticator needs to know is the user identity and success or failure status. The authenticator module passes a success code and user identity to the invoking process 409. The process described in FIG. 4 is not only efficient, but can also be used for security auditing and filtering against attacks to the customer website.

Alternatively, the website can be designed so that the client first goes through authentication at the customer server. The customer server then provides a URL link (with the user identifier in the link parameter) to the client to download content from the Web cache server or streaming server. Before the Web cache server or streaming server starts to deliver the content to the client, the data deliverer module in the Web cache server or streaming server uses a specified URL and sends an HTTP request (with the user identity as the parameter in the URL request) to the customer server to check if the customer server approves the file delivery. If the response is affirmative, then the data deliverer module continues with the data delivery.

If the client makes the HTTP request for the data directly to the Web cache server or streaming server without first going through the authentication at the customer server, the Web cache server or streaming server redirects the client back to the content provider. After the authentication, the customer server uses an HTTP redirect to redirect the client to the Web cache server or streaming server for data delivery. This process involves two HTTP redirects.

Dynamic Fingerprinting

An embodiment of the invention performs dynamic fingerprinting of content. The process begins when the user selects content to be downloaded to his computer. Referring again to FIG. 2, the user clicks on a link in the customer's Web page for downloading or streaming a particular content. The client 201 sends a request to the Web cache server 202 for the specified content. The data deliverer module 204 checks for fingerprint configuration settings in the configuration database 210. If external authentication is specified in the configuration, then the CDN authenticator module 207 uses the authentication URL specified in the configuration and acts an authentication proxy, sending an authorization request to the authenticator module 109 on the customer's server 203.

If local authentication is specified in the configuration, then the CDN authenticator module 207 performs authentication locally. The CDN authenticator module 207 returns the success or fail indicator to the data deliverer module 204. The data deliverer module 204 then checks if obtaining the fingerprint is specified as external in the configuration database 210. If external fingerprint generation is specified, the data deliverer module 204 instructs fingerprint retriever module 206 to retrieve the fingerprint from the specified URL at the customer's server 203. The origin fingerprint generator 208 generates a fingerprint based on the user information sent by the fingerprint retriever module 206 and sends the fingerprint to the fingerprint retriever module 206.

If local fingerprint generation is specified, data deliverer module 204 instructs the local fingerprint generator 205 to generate the fingerprint locally.

Upon receipt of the fingerprint, the data deliverer module 204 then starts to send the requested content or stream to the client 201. Based on the offset specified in the configuration data in the configuration database 210, the data deliverer module 204 inserts the fingerprint precisely at the offset or replaces a place holder at the specified offset. If the mode specified is for insertion of the fingerprint, the data deliverer module 204 will insert the fingerprint precisely at the offset and continue the sending or streaming of the original file.

If the mode specified is for replacement of a place holder, the data deliverer module 204 will skip the length equal to the size of the fingerprint code at the specified offset and continue the sending or streaming of the rest of the original file.

Implementing Mechanisms

The Web server, POP DNS server, client DNS server, and probe may each be implemented on a computer system. FIG. 5 is a block diagram that illustrates a computer system 500 upon which an embodiment of the invention may be implemented. Computer system 500 includes a bus 502 or other communication mechanism for communicating information, and a processor 504 coupled with bus 502 for processing information. Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

The invention is related to the use of computer system 500 for implementing the techniques described herein. According to one embodiment of the invention, those techniques are performed by computer system 500 in response to processor 504 executing one or more sequences of one or more instructions contained in main memory 506. Such instructions may be read into main memory 506 from another machine-readable medium, such as storage device 510. Execution of the sequences of instructions contained in main memory 506 causes processor 504 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 500, various machine-readable media are involved, for example, in providing instructions to processor 504 for execution. Such a medium may take many forms, including but not limited to, non-volatile media, volatile media, and transmission media. Non-volatile media includes, for example, optical or magnetic disks, such as storage device 510. Volatile media includes dynamic memory, such as main memory 506. Transmission media includes coaxial cables, copper wire and fiber optics, including the wires that comprise bus 502. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 504 for execution. For example, the instructions may initially be carried on a magnetic disk of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are exemplary forms of carrier waves transporting the information.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution. In this manner, computer system 500 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method for performing dynamic fingerprinting of multimedia content, comprising:
   receiving a user request for multimedia content at a given CDN server in a content delivery network (CDN) that includes a plurality of CDN servers that serve content on behalf of content provider customers;
   with the given CDN server, obtaining a fingerprint from another server associated with the CDN, the fingerprint containing information pertaining to the user;
   sending the requested multimedia content to the user from the given CDN server; and
   wherein the sending step includes inserting the fingerprint into the requested multimedia content at the time of sending the requested multimedia content to the user.

2. The method of claim 1, wherein the given CDN server sends information for use in generating the fingerprint information to said another server associated with the CDN.

3. The method of claim 2, wherein the information sent to said another server comprises any of: a cookie, a user id, a file name, a URL, a user IP address, and a posted value from the user.

4. The method of claim 1, wherein the requested multimedia content originated from a content provider customer and is retrieved by the given CDN server from a server associated with the content provider customer.

5. The method of claim 1, wherein the requested multimedia content comprises streaming media.

6. The method of claim 1, further comprising: reporting, to a given one of the content provider customers, an identifier associated with the user to whom the requested multimedia content was sent.

7. The method of claim 1, wherein the requested multimedia content comprises video content.

8. The method of claim 1, wherein the fingerprint incorporates any of the following information: user information, user authentication token; and license key for the user.

9. An apparatus for performing dynamic fingerprinting of multimedia content, comprising:
- a server that receives a user request for a multimedia content, the server being a given CDN server in a content delivery network (CDN) that includes a plurality of CDN servers that serve content on behalf of content provider customers;
- the given CDN server obtaining a fingerprint from another server associated with the CDN, the fingerprint containing information pertaining to the user;
- the given CDN server sending the requested multimedia content to the user from the given CDN server; and
- wherein the given CDN server inserts the fingerprint into the requested multimedia content at the time of sending the requested multimedia content to the user;
- wherein the given CDN server comprises circuitry forming one or more processors and computer memory holding instructions to be executed by the one or more processors for causing the server to operate as set forth above.

10. The apparatus of claim 9, wherein the given CDN server sends information for use in generating the fingerprint information to said another server associated with the CDN.

11. The apparatus of claim 10, wherein the information sent to said another server comprises any of: a cookie, a user id, a file name, a URL, a user IP address, and a posted value from the user.

12. The apparatus of claim 9, wherein the requested multimedia content comprises streaming media.

13. The apparatus of claim 9, wherein the given CDN server records information about the delivery so as to enable reporting, to a given one of the content provider customers, of the identity of the user to whom the requested multimedia content was sent.

14. The apparatus of claim 9, wherein the requested multimedia content originated from a content provider customer and is retrieved by the given CDN server from a server associated with the content provider customer.

15. The apparatus of claim 9, wherein the requested multimedia content comprises video content.

16. The apparatus of claim 9, wherein the fingerprint incorporates any of the following information: user information, user authentication token; and license key for the user.

17. A non-transitory computer-readable medium carrying one or more sequences of instructions for performing dynamic fingerprinting of multimedia content, wherein execution of the one or more sequences of instructions by one or more processors causes the one or more processors to perform steps comprising:
- receiving a user request for a multimedia content at a given CDN server in a content delivery network (CDN) that includes a plurality of CDN servers that serve content on behalf of content provider customers;
- with the given CDN server, obtaining a fingerprint from another server associated with the CDN, the fingerprint containing information pertaining to the user;
- sending the requested multimedia content to the user from the given CDN server; and
- wherein the sending step includes inserting the fingerprint into the requested multimedia content at the time of sending the requested multimedia content to the user.

18. The non-transitory computer-readable medium of claim 17, wherein the given CDN server sends information for use in generating the fingerprint information to said another server associated with the CDN.

19. The non-transitory computer-readable medium of claim 18, wherein the information sent to said another server comprises any of: a cookie, a user id, a file name, a URL, a user IP address, and a posted value from the user.

20. The non-transitory computer-readable medium of claim 17, wherein the requested multimedia content originated from a content provider customer and is retrieved by the given CDN server from a server associated with the content provider customer.

21. The non-transitory computer-readable medium of claim 17, wherein the requested multimedia content comprises streaming media.

22. The non-transitory computer-readable medium of claim 17, wherein the steps further comprise: reporting, to a given one of the content provider customers, the identity of the user to whom the requested multimedia content was sent.

* * * * *

UNITED STATES PATENT AND TRADEMARK OFFICE
CERTIFICATE OF CORRECTION

PATENT NO. : 8,271,793 B2
APPLICATION NO. : 12/489375
DATED : September 18, 2012
INVENTOR(S) : Swildens et al.

Page 1 of 1

It is certified that error appears in the above-identified patent and that said Letters Patent is hereby corrected as shown below:

On the Title Page Item (73) Assignee:

Please replace the word "Akami" with "Akamai"

Signed and Sealed this
Seventh Day of May, 2013

Teresa Stanek Rea
*Acting Director of the United States Patent and Trademark Office*